(12) United States Patent
Vianello et al.

(10) Patent No.: US 11,565,570 B2
(45) Date of Patent: Jan. 31, 2023

(54) AIR CONDITIONING RECHARGING MACHINE FOR VEHICLE AIR-CONDITIONING SYSTEM

(71) Applicant: TEXA S.P.A., Monastier di Treviso (IT)

(72) Inventors: Bruno Vianello, Roncade (IT); Stefano Meneghel, Monastier di Treviso (IT)

(73) Assignee: TEXA S.P.A., Monastier di Treviso (IT)

( * ) Notice: Subject to any disclaimer, the term of this patent is extended or adjusted under 35 U.S.C. 154(b) by 311 days.

(21) Appl. No.: 16/321,301

(22) PCT Filed: Aug. 2, 2017

(86) PCT No.: PCT/IB2017/054730
§ 371 (c)(1),
(2) Date: Jan. 28, 2019

(87) PCT Pub. No.: WO2018/025200
PCT Pub. Date: Feb. 8, 2018

(65) Prior Publication Data
US 2019/0160911 A1 May 30, 2019

(30) Foreign Application Priority Data
Aug. 2, 2016 (IT) .......................... 102016000081272

(51) Int. Cl.
*F25B 45/00* (2006.01)
*B60H 1/00* (2006.01)
(52) U.S. Cl.
CPC ......... *B60H 1/00585* (2013.01); *F25B 45/00* (2013.01); *F25B 2345/001* (2013.01);
(Continued)

(58) Field of Classification Search
CPC .......... F25B 2345/001; F25B 2345/002; F25B 2345/0052; B60H 1/00585
See application file for complete search history.

(56) References Cited

U.S. PATENT DOCUMENTS

| 5,924,299 A * | 7/1999 | Karl ........................ F25B 41/20 62/225 |
| 6,286,327 B1 * | 9/2001 | Karl ........................ F25B 41/20 62/196.4 |

(Continued)

FOREIGN PATENT DOCUMENTS

| EP | 2 360 040 | 8/2011 | |
| EP | 2 365 261 | 9/2011 | |
| EP | 2365261 A2 * | 9/2011 | .............. F25B 45/00 |

*Primary Examiner* — Nael N Babaa
(74) *Attorney, Agent, or Firm* — Leason Ellis LLP (57) ABSTRACT

An air conditioning recharging machine includes a pair of flexible hoses connected to the air-conditioning system and a recharging assembly to supply a refrigerant fluid to the air-conditioning system through the flexible hoses. The machine has a discharging assembly to discharge the refrigerant fluid from the air-conditioning system and a valve distributor body, which is provided with a series of inlets/outlets hydraulically connected to the flexible hoses, to the recharging assembly and to the discharging assembly. The valve distributor body is in the form of a monobloc made of rigid material which is provided with straight inner through-ducts, each of which extends in the monobloc so as to have the two axial ends which are arranged on two respective faces of said monobloc opposite one to the other, and are each closed by a respective solenoid valve coupled to the face itself.

8 Claims, 8 Drawing Sheets

(52) U.S. Cl.
CPC ... *F25B 2345/002* (2013.01); *F25B 2345/006* (2013.01); *F25B 2345/0052* (2013.01)

(56) References Cited

U.S. PATENT DOCUMENTS

| | | |
|---|---|---|
| 7,841,363 B1 | 11/2010 | Suharno |
| 2004/0020233 A1 | 2/2004 | Ramachandran et al. |
| 2011/0240910 A1* | 10/2011 | Carr .................. C10M 171/008 252/68 |

* cited by examiner

AIR CONDITIONING RECHARGING MACHINE FOR VEHICLE AIR-CONDITIONING SYSTEM

CROSS-REFERENCE TO RELATED PATENT APPLICATIONS

This application is a U.S. National Phase Application under 35 U.S.C. § 371 of International Patent Application No. PCT/IB2017/054730, filed Aug. 2, 2017, which claims the priority of Italian Application No. 102016000081272, filed Aug. 2, 2016, which is incorporated by reference as if expressly set forth in its entirety herein.

TECHNICAL FIELD

The invention relates to an air conditioning recharging machine designed to recharge a refrigerant fluid into an air-conditioning system (2) mounted on board of a motor vehicle. In particular, the invention concerns a valve distributor body comprised in the aforesaid machine and an operating method to operate the valve distributor body in the machine.

BACKGROUND ART

Air conditioning recharging machines are used to carry out a series of maintenance operations on the air-conditioning system mounted on board of the vehicle. Maintenance operations usually comprise: an air-conditioning system emptying step, during which the refrigerant fluid contained in the air-conditioning system is discharged in a controlled manner, a filtering step, during which oil is separated from the discharged refrigerant fluid and the filtered oil as well as the refrigerant fluid are recovered in respective tanks, and a complete recharging step, during which the fluid is completely recharged into the air-conditioning system.

Currently known recharging machines performing the aforesaid operations usually comprise two flexible hoses, which are arranged on the outside of the frame of the machine and can be connected to corresponding high-pressure and low-pressure connectors of the vehicle air-conditioning system; a recharging assembly, which, when ordered to, during the recharging step, supplies a predetermined quantity of refrigerant fluid to the air-conditioning system through the two outer hoses; a discharging assembly, which is designed to perform, during the emptying step, a controlled draining of the refrigerant fluid contained in the system through the outer hoses, so as to recover the discharged fluid in a tank; and a hydraulic circuit, which is provided with a series of hydraulic branches and ducts, which are connected to the two outer hoses and to some components/devices of the discharging and recharging assemblies, as well as a series of solenoid valves, which are arranged along the branches/ducts so as to close/open the branches/ducts based on relative electric signals, in order to establish a fluid communication between the components/devices of the discharging and recharging assemblies and/or the outer hoses.

Furthermore, in order to reduce the costs of the recharging machines described above, solutions were conceived, which involve sharing some components/devices of the recharging and discharging assemblies during the recharging and discharging steps implemented by the machine. These solutions, however, lead to an increase in the complexity of the hydraulic circuit both in terms of number of branches/ducts and in terms of number of solenoid valves used to control the circuit.

To overcome this drawback, solutions were conceived, which involve the use of a valve distributor body, which comprises a parallelepiped-shaped oblong bar made of a metal material, which extends along a longitudinal axis and has inlets, outlets and inner ducts connecting the inlets to the outlets. Furthermore, solenoid vales are arranged on the bar in order to control the hydraulic opening/closing of the ducts. In particular, the solenoid valves are usually arranged on a same side support wall of the bar, which develops parallel to the longitudinal axis, whereas the bar is provided with a series of straight through-ducts, each extending parallel to the longitudinal axis so as to establish a communication between the two faces of the bar that are positioned at the ends thereof and are orthogonal to the longitudinal axis and to the side support wall of the solenoid valves. On the bar there are, furthermore, secondary channels, each extending transversely to the longitudinal axis starting from a main duct towards the side support wall of the solenoid valves, so as to establish a communication between the main duct and an inlet/outlet passage of a solenoid valve. The ends/openings of the main through-ducts are sealed through pressure plugs, generally consisting of meal spheres.

The use of pressure plugs in the bar is affected by significant drawbacks in terms of safety as, should they accidentally be uncoupled from the bar, the operators of the machine may be subjected to serious dangers. The drawbacks and the risks associated with pressure plugs are amplified when the pressures of the refrigerant fluid are extremely high. To this regard, the Applicant found out that the distributor body described above turns out to be inadequate when used to perform maintenance operations on vehicle air-conditioning systems using carbon dioxide, where, as it is known, the operating pressure of the fluid reaches 170 bar, as it can be subjected to the uncoupling of the pressure plugs.

DISCLOSURE OF INVENTION

Therefore, the object of the invention is to provide an air conditioning recharging machine provided with a valve distributor body, which is capable of overcoming the drawbacks described above and, in particular, completely eliminates the use of pressure plugs.

According to the invention, there is provided an air conditioning recharging machine according to the appended claims.

BRIEF DESCRIPTION OF THE DRAWINGS

The invention will now be described with reference to the accompanying drawings, which show a non-limiting embodiment thereof, wherein.

BEST MODE FOR CARRYING OUT THE INVENTION

The invention will now be described in detail with reference to the accompanying Figures, so as to allow a person skilled in the art to carry it out and to use it. Possible changes to the embodiments described will be immediately evident to skilled people and the generic principles described can be applied to other embodiments and applications without for this reason going beyond the scope of protection of the invention as it is defined in the appended claims. Therefore, the invention cannot be considered as limited to the embodiments described and shown herein, but it has to be associated with the widest scope of protection possible in accordance with the principles and the features described and claimed herein.

Figure 1:
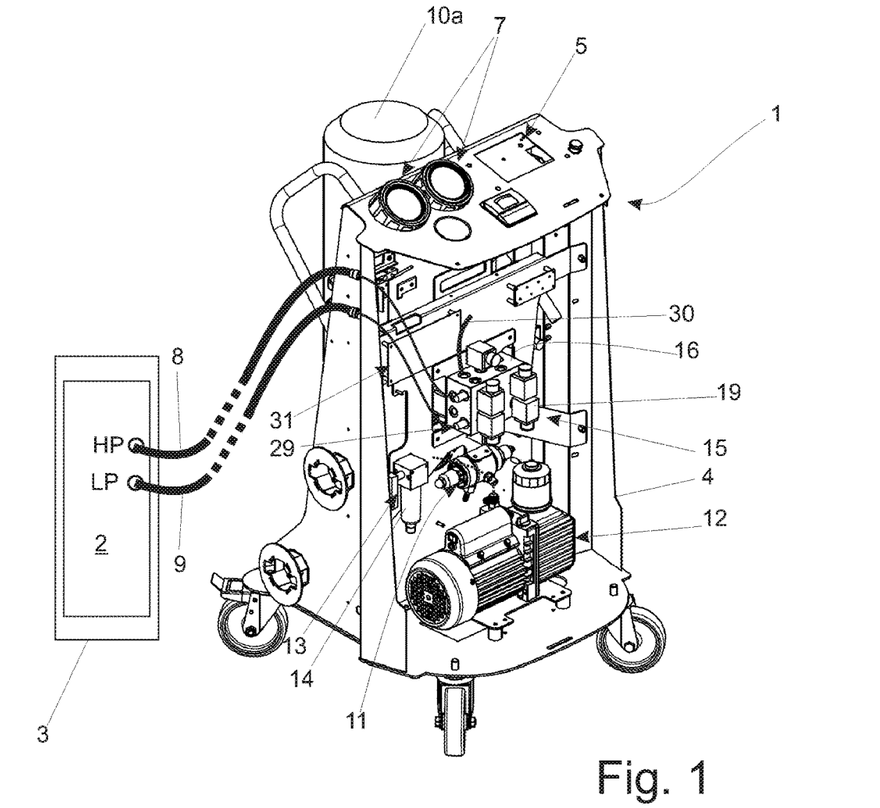
FIG. 1 is a perspective view, with parts removed for greater clarity, of an air conditioning recharging machine according to the invention.

With reference to FIG. 1, number 1 indicates, as a whole, an air conditioning recharging station or machine, which is structured so as to be connected to and hydraulically cooperate with (namely, be in fluid communication with) an air-conditioning system 2 mounted on board of a motor vehicle 3, such as for example an automotive vehicle (i.e. a car, a truck, a bus or any other similar terrestrial motor vehicle).

The recharging machine 1 is configured so as to carry out a series of maintenance operations on the air-conditioning system 2. Preferably, the maintenance operations can comprise at least: a discharging operation, namely an operation carried out to empty the refrigerant fluid contained/present in the air-conditioning system 2, and a recharging/filling operation carried out to recharge the air-conditioning system 2 with a refrigerant fluid (a new fluid or a recovered fluid). It is understood that the maintenance operations performed by the air conditioning recharging machine 1 are not limited to the discharging and recharging operations described above, but they can also comprise additional operations, such as a vacuum step or a pressure loss control step or similar operating steps.

According to a preferred embodiment, the discharged refrigerant fluid and/or the fluid recharged by the air conditioning recharging machine 1 preferably comprises carbon dioxide, whose operating pressure ranges from approximately 30 bar to approximately 170 bar, preferably from approximately 40 bar to approximately 130 bar. However, the invention is not limited to a refrigerant fluid corresponding to carbon dioxide, but, according to alternative embodiments, it could also correspond to refrigerants such as HFC, HFO or organic fluids.

According to a preferred embodiment shown in FIG. 1, the recharging machine 1 preferably comprises: a box-shaped frame 4 (partially removed in FIG. 1 for greater clarity), a series of support wheels resting on the ground and associated with the base of the frame 4, a control panel 5, which is preferably arranged in the upper part of the frame 4 and is structured so as to allow the user to select/give commands to the recharging machine 1, and one or more displaying devices 7 arranged on the frame 4 so as to show to the user information indicating predetermined values/parameters associated with the operation of the recharging machine 1. The displaying devices 7 can comprise, for example at least a pair of gauges and/or a display or any other similar apparatus configured to display at least the pressures of the refrigerant fluid exchanged with the high-pressure circuits and low-pressure circuits (not shown), respectively, comprised in the air-conditioning system 2.

The recharging machine 1 comprises, furthermore, a pair of hoses 8 and 9, which preferably at least partially project on the outside of the frame 4, are connected, with the two ends, to two respective connection terminals of the air-conditioning recharging machine 1 and have, at the respective opposite free ends, respective connectors that are structured so as to be manually connected to corresponding connectors of the high-pressure circuits HP and of the low-pressure circuits LP, respectively, of the vehicle air-conditioning system 2.

Figure 13:
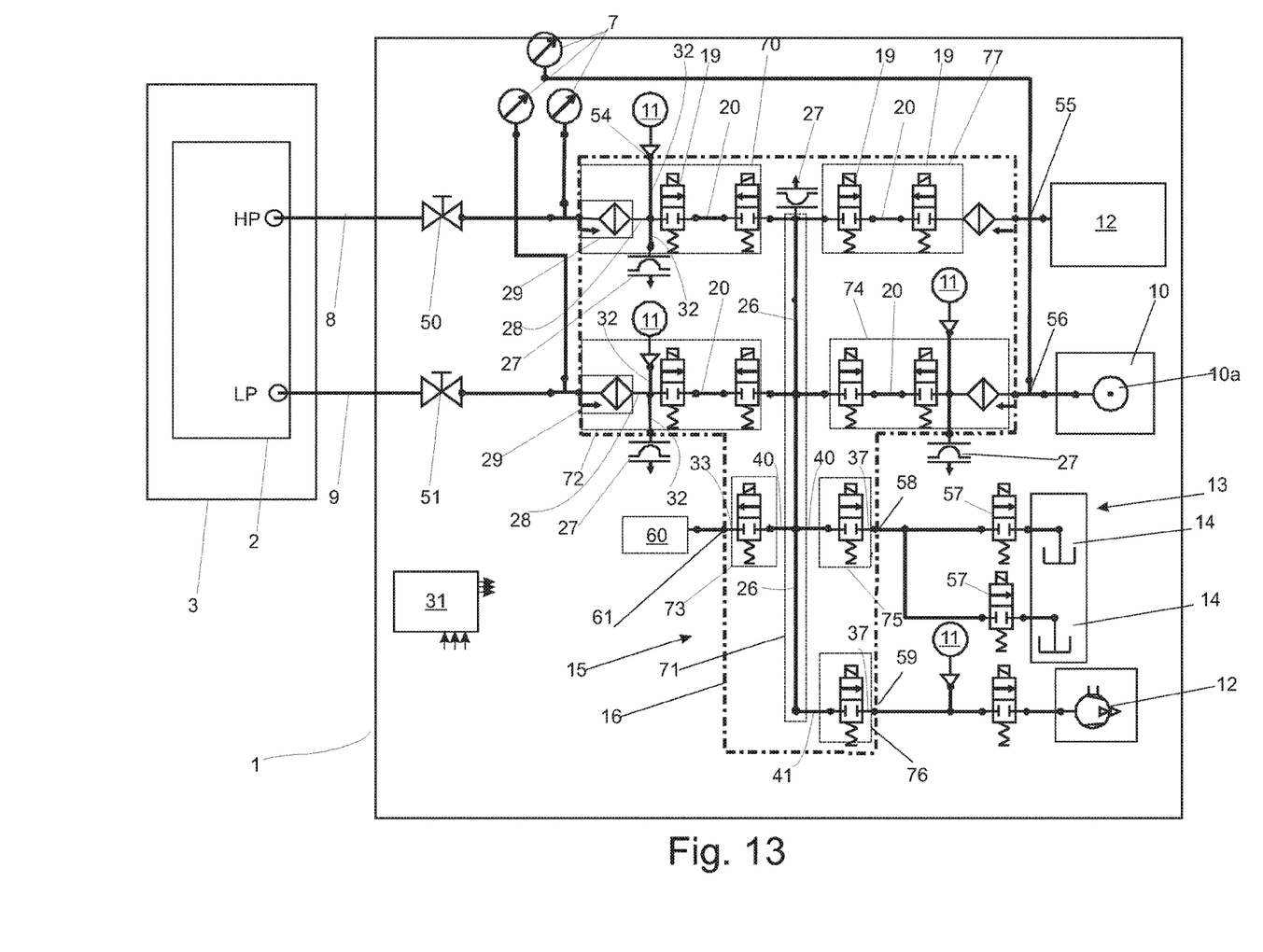
FIG. 13 is a circuit diagram showing some components/apparatuses/devices and the relative connections through the valve distributor body present in the machine shown in FIG. 1.

With reference to FIGS. 1 and 13, the recharging machine 1 comprises, furthermore, recharging means 10 provided with at least a main tank 10a designed to contain the refrigerant fluid, sensor means comprising measuring devices 11 configured so as to determine the pressure/flow rate of the refrigerant fluid, adjusting means comprising fluid control apparatuses 12 configured so as to control the flow rate/pressure of the refrigerant fluid, fluid separating means 13 comprising filtering devices designed to filter oil and/or other additive substances from the refrigerant fluid, and secondary tanks 14 to store oils and/or other filtered substances.

The measuring devices 11 are known devices and, as they are not the subject-matter of the invention, they will not be further described, except for the mention of the fact that they comprise, for example, pressure switches, gauges, pressure transducers, and/or flow measuring sensors. The fluid control apparatuses 12 are known as well and, as they are not the subject-matter of the invention, they will not be further described, except for the mention of the fact that they comprise, for example, a vacuum pump and/or a compressor and/or similar apparatuses.

Figure 2:
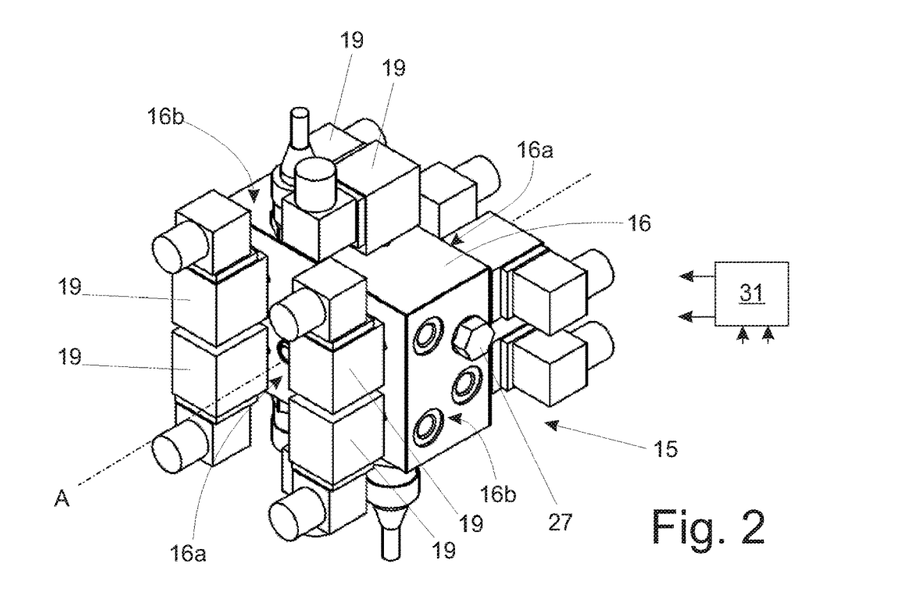
FIG. 2 is a perspective view of a valve distributor body mounted/comprised in the machine shown in FIG. 1.
Figure 3:
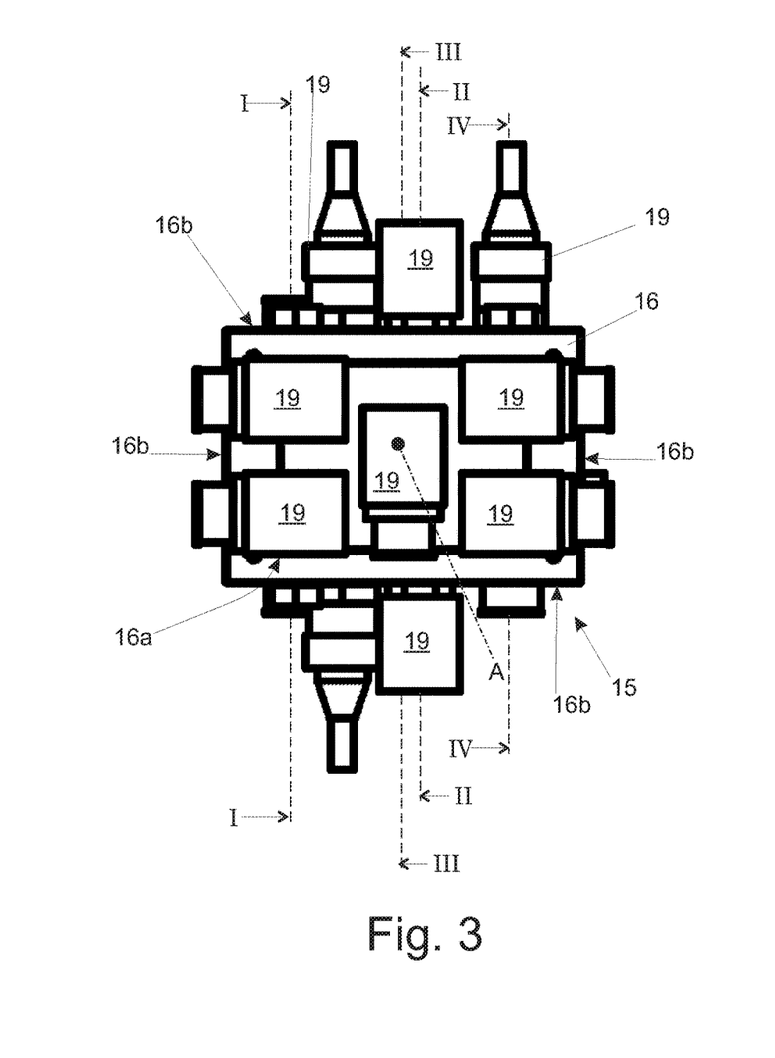
FIGS. 3 and 4 are two side elevation views, from opposite sides, of the valve distributor body shown in FIG. 2.
Figure 4:
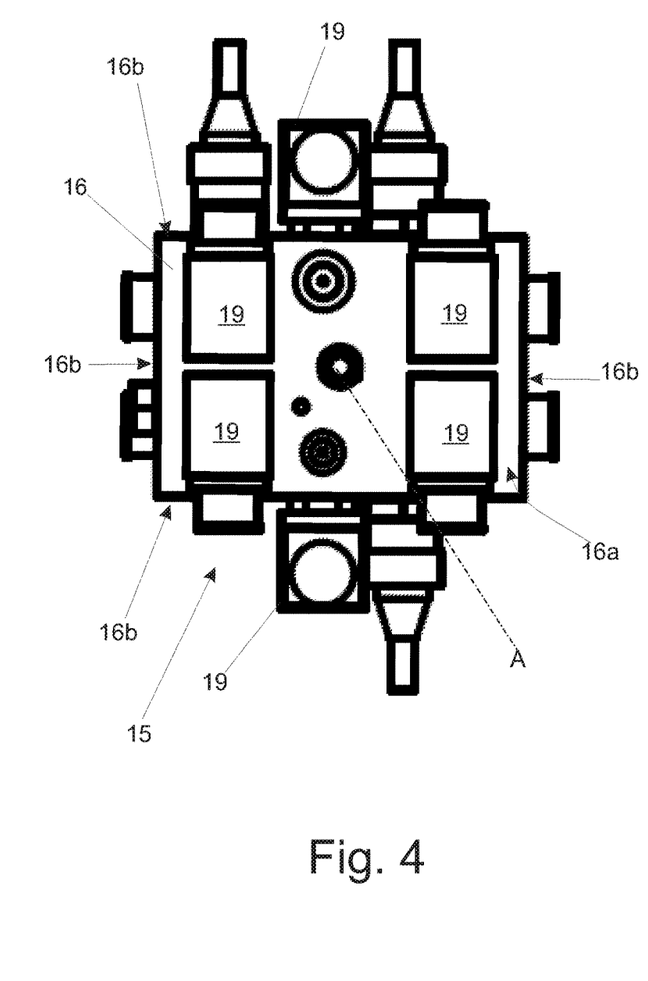
Figure 5:
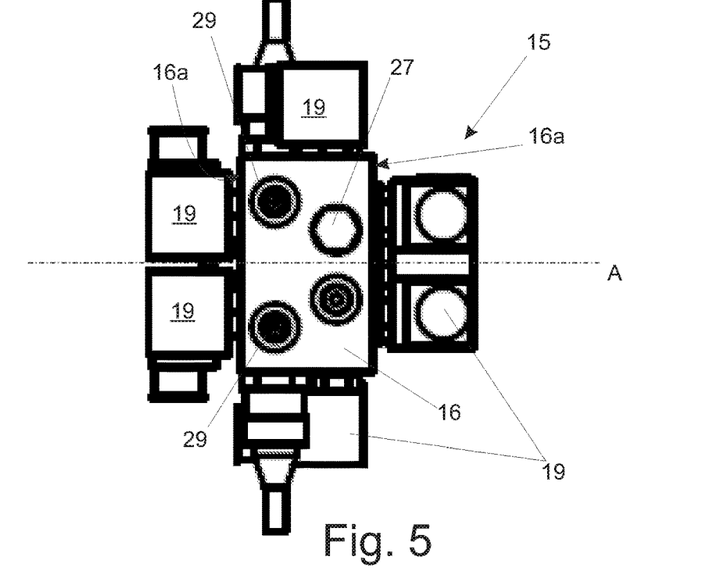
FIG. 5 is view from the top of the valve distributor body shown in FIG. 2.

With reference to FIGS. 1, 2 and 13, the recharging machine 1 is further provided with a valve distributor body 15, which is preferably arranged inside the frame 4 and comprises a monobloc 16 provided with a plurality of inlets/outlets, to which are connected, through relative outer hoses 30 that are preferably-though not necessarily-flexible, at least: the two hoses 8 and 9, the measuring devices 11, the fluid control apparatuses 12, the recharging means 10, and the separating means 13.

With reference to FIGS. 6-12, the valve distributor body 15 further comprises a plurality of ducts, which are formed in the monobloc 16 so as to form a hydraulic circuit, which hydraulically connects the inlets to respective outlets. The valve distributor body 15 comprises, furthermore, a plurality of solenoid valves 19, which are coupled to the monobloc 16 so as to be supported from the latter and are designed, in use, to be opened and closed by an electronic control unit 31 mounted in the recharging machine 1, so as to selectively establish a fluid communication between one or more inlets and one or more outlets according to the description hereinafter.

With reference to the embodiment shown in FIGS. 2, 6, 8 and 9, the monobloc 16 consists of a one-piece body, which is preferably made of a metal material, such as, for example, a steel or aluminium alloy or the like.

Figure 6:
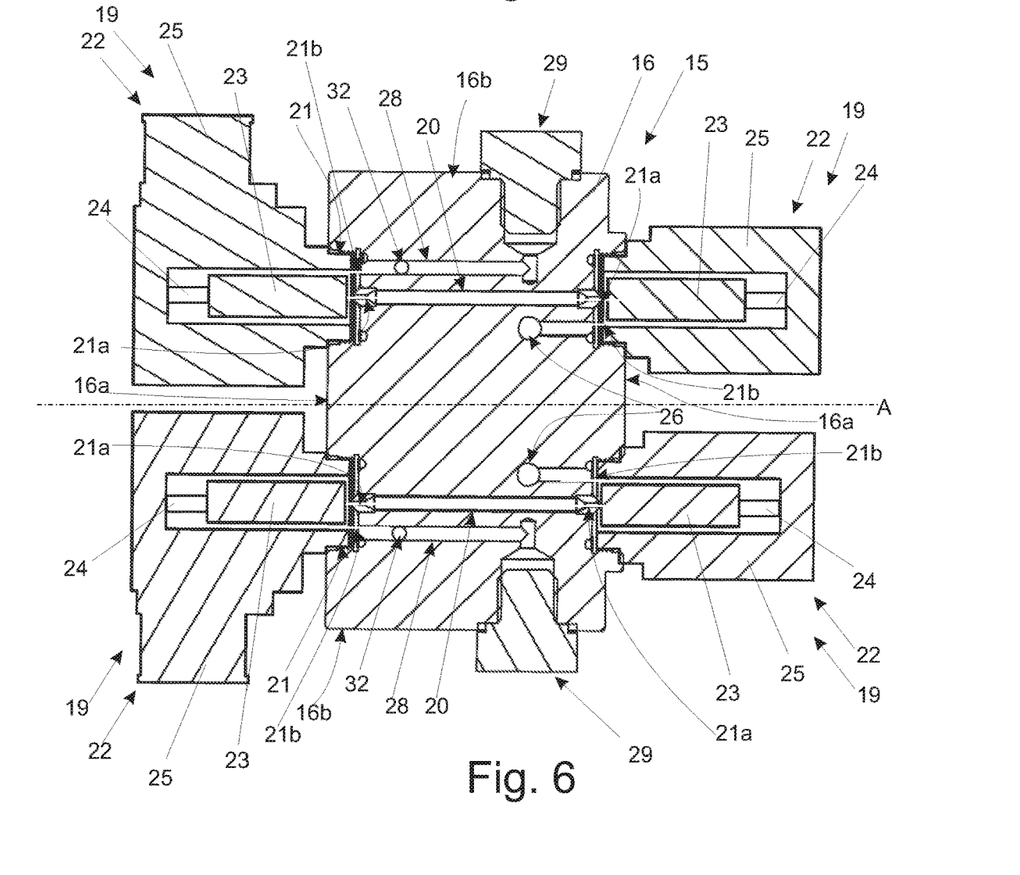
FIG. 6 is a cross section I-I of the valve distributor body shown in FIG. 3.
Figure 12:
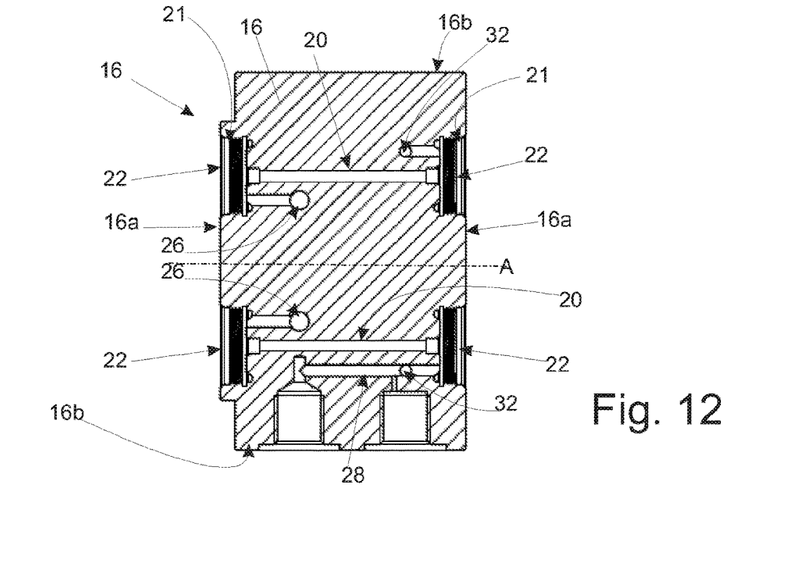
FIG. 12 is a cross section IV-IV, with parts removed for greater clarity, of the monobloc shown in FIG. 3.

With reference to the embodiment shown in FIGS. 6 and 12, the monobloc 16 has a preferably polyhedral shape and is provided with one or more through-ducts 20, each developing/extending inside the monobloc 16 along a straight direction and having the two opposite axial ends, i.e. the two opposite openings, that are arranged on two respective faces 16a of the monobloc 16 opposite to one another and are each closed by a corresponding solenoid valve 19, which is steadily/rigidly coupled to the face 16a.

The Applicant found out that, by creating straight through-ducts 20 in the monobloc 16 between two opposite faces 16a of the monobloc 16, so as to establish a direct communication between the opposite faces 16a, and by fixing two solenoid valves 19 on the two faces 16a, each in the area of an axial end of the through-duct 20, so as to be in communication with the latter, you can obtain the technical effect of closing the axial ends of the ducts 20 directly through the solenoid valves 19.

The technical effect obtained allows eliminating the need of using pressure plugs to close the through-ducts 20 present in the monobloc 16, thus increasing the safety of the recharging machine 1. The technical effect obtained further allows to cause the valve distributor body 15 to be designed to be also used for maintenance operations to be carried out on vehicle air-conditioning systems using a high-pressure refrigerant fluid, such as for example carbon dioxide.

Another technical effect obtained consists in significantly reducing the dimensions of the valve distributor body. Indeed, it is possible to design a layout of the through-ducts 20 of the monobloc 16 that allows to distribute the solenoid valves on all the faces of the monobloc 16. This distribution allows to reduce the dimensions of the monobloc 26, thus obtaining a more compact valve distributor body 15.

With reference to the exemplifying embodiment shown in FIGS. 2 to 9, the monobloc 16 substantially has the shape of a parallelepiped and has a reference longitudinal axis A as well as at least two side faces 16a that are opposite to one another and orthogonal to the axis A.

In the example shown in FIG. 6, the monobloc 16 is provided with at least four inner through-ducts 20 (only two of them are shown in the cross section of FIG. 6), which extend between the two opposite faces 16a of the monobloc 16 parallel to the axis A and spaced apart from one another, so as to establish a mutual communication between the two faces 16a. In the example shown, the four inner through-ducts 20 are arranged so as to lie in pairs on two respective planes, which are parallel to one another, orthogonal to the faces 16a and spaced apart from one another. Preferably, the distance between each pair of through ducts 20 arranged on a same lying plane is equal to the distance present between the pair of through-ducts 20 available on the other lying plane. The solenoid valves 19 and the corresponding openings at the axial ends of the through-ducts 20 can be arranged on the face 16a, for example, according to the vertices of a rectangle or of a square.

With reference to an exemplifying embodiment shown in FIGS. 2 to 5 and to FIG. 13, the valve distributor body 15 can comprise four pairs of solenoid valves 19, each provided with two solenoid valves that are steadily fixed on the two opposite faces 16a of the monobloc 16 in positions that are such as to close to the two opposite axial ends of a relative through-duct 20.

Figures 7, 8, 9:
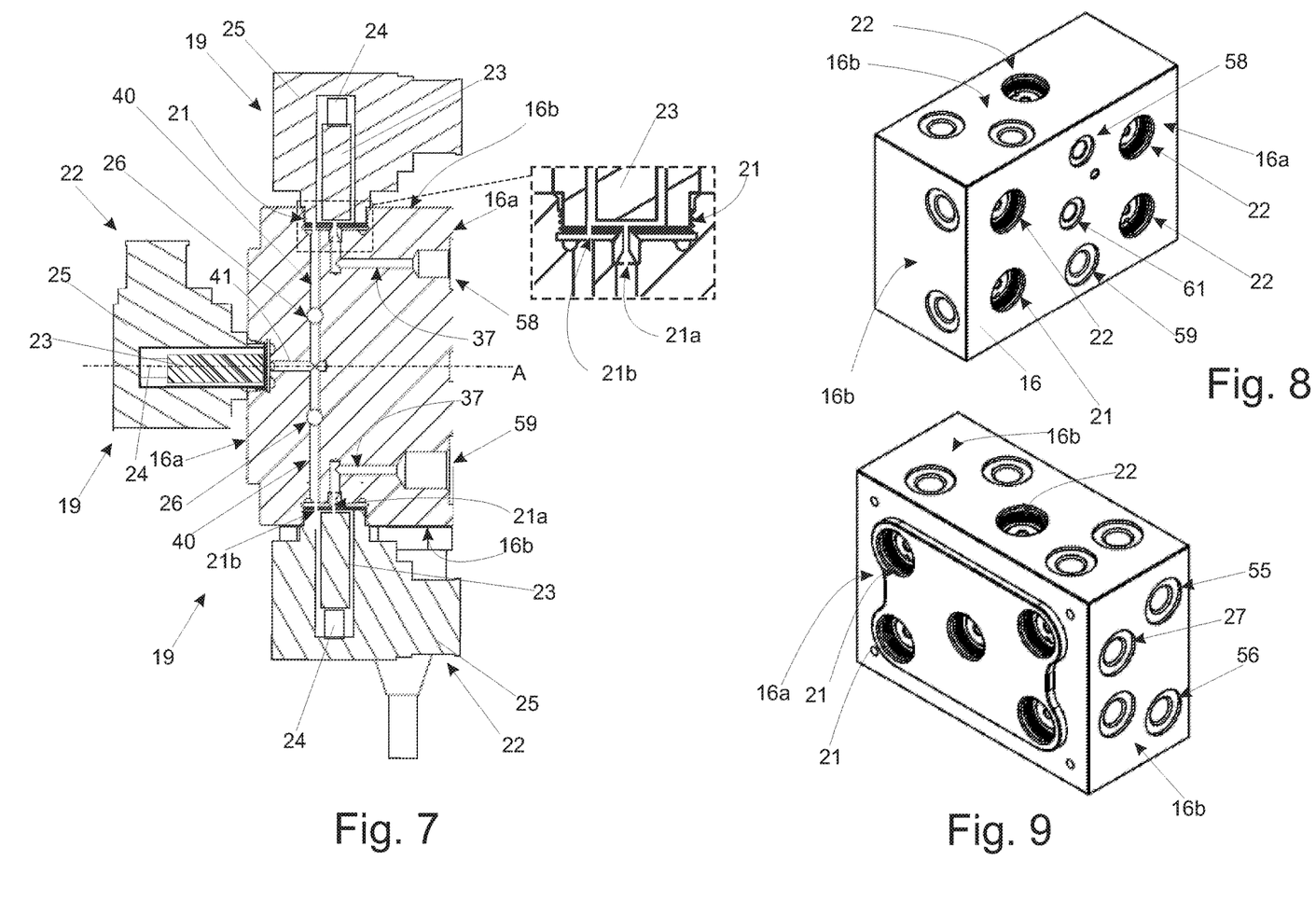
FIG. 7 is cross section II-II of the valve distributor body shown in FIG. 3.
FIGS. 8 and 9 are two perspective views of the monobloc comprised in the valve distributor body shown in FIG. 2.

According to a preferred embodiment shown in FIGS. 6 and 7, the solenoid valves 19 can each comprises a valve body 21, which is provided with at least two passages, which are designed to be connected to respective inner ducts of the monobloc 16 and each define, based on the direction of the refrigerant fluid in the ducts, an inlet or, alternatively, an outlet of the solenoid valve 19. The solenoid valves 19 can further comprise a shutter assembly 22, which is coupled to the valve body 21 so as to perform the opening/closing of the solenoid valve 19.

With reference to a possible exemplifying embodiment shown in FIGS. 6, 7, 8, 9 and 11, the valve bodies 21 of the solenoid valves 19 are conveniently integrated/obtained directly on the faces 16a/16b of the monobloc 16 and each comprise a cavity or seat 22, preferably with a cylindrical shape, which preferably extends coaxial to the longitudinal axis of a relative through-duct 20 and has, at the centre of its inner bottom wall, an opening, which is associated with an axial end of the through-duct 20 and defines a first passage 21a of the solenoid valve 19. The valve body 21 has, furthermore, a second passage 21b comprising a hole, which can be obtained in the peripheral area of the inner bottom wall of the seat 22 and extends in the monobloc 16 preferably parallel to and spaced apart from (beside) the through-duct 20.

On the other hand, as far as the shutter assembly 22 is concerned, in the example shown in FIG. 6, it can be provided with a threaded portion steadily screwed into the threaded wall of the seat 22 and has an inner chamber communicating, for example, with the first passage 21a and/or the second passage 21b. The shutter assembly 22 can comprise a shutter body 23, which is preferably mounted so as to move in the inner chamber between a closed position, in which the shutter body 23 hermetically interrupts the flow of fluid between the first passage 21a and the second passage 21b, and an open position, in which the shutter body 23 is arranged so as to allow fluid to flow between the first passage 21a and the second passage 21b.

The shutter assembly 22 can preferably comprise, furthermore, mechanical elastic organs 24, for example a spring associated with/coupled to the shutter body 23 so as to exert a first elastic force upon the shutter body 23 in order to hold the shutter body 23 in the closed position. Preferably, the inner chamber and the shutter body 23 are structured so as to cause the refrigerant fluid present in the first passage 21a to exert a second force upon the shutter body 23 that is opposite to the first force, so as to cause the movement of the shutter body 23 towards said open position. Preferably, the inner chamber and the shutter body 23 are structured so as to cause the refrigerant fluid present in the second passage 21b to exert a third force upon the shutter body 23 that is concurrent with the first force, so as to cause the movement of the shutter body 23 towards said closed position.

The shutter assembly 22 comprises, furthermore, a preferably electric/magnetic actuator device 24, which is structured so as to move the shutter body 23 between the open and closed positions based on the electric command generated by the electronic control unit 31.

With reference to the preferred exemplifying embodiment shown in FIGS. 6 and 12, each one of the four through-ducts 20 (only two of them are shown in FIG. 6) establishes a mutual fluid communication, in a direct (namely, without interruptions/deflections) and exclusive manner, between the first passages 21*a* of a relative pair of solenoid valves 19 fixed on the opposite faces 16*a*.

As a matter of fact, the Applicant found out that, by connecting the axial ends of the through-duct 20, in a direct and exclusive manner, to the two corresponding first passages 21*a* of the pair of solenoid valves 19, it is obtained the technical effect of causing the automatic opening of the solenoid valves 19 when the pressure of the refrigerant fluid present in the relative through-duct 20 exceeds a critical maximum pressure threshold. Therefore, the technical effect obtained solves the technical problem associated with the over-pressures that can be generated in an uncontrolled manner in the through-ducts 20 of the monobloc 16 due to the changes of state of the refrigerant fluid upon variation, for example, of the temperature, a condition that turns out to be extremely critical especially in case of carbon dioxide.

Figures 10, 11:
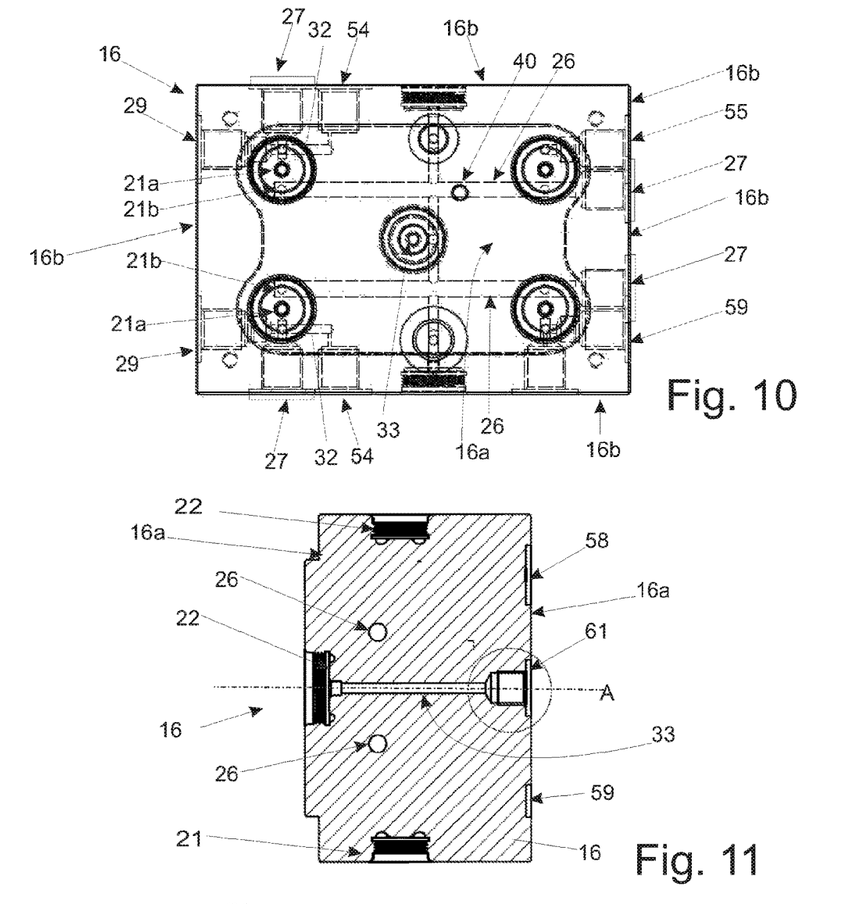
FIG. 10 is a front elevation view, with sectional parts and parts removed for greater clarity, of the monobloc shown in FIGS. 8 and 9.
FIG. 11 is a cross section III-III, with parts removed for greater clarity, of the monobloc shown in FIG. 3.

With reference to FIGS. 6, 10 and 12, the monobloc 16 can further be provided with one or more preferably dead ducts 26, each extending starting from a face 16*b* of the monobloc 16 that is orthogonal to the faces 16*a*, along a direction that is transverse, preferably perpendicular, to the through-ducts 20 at a given distance from the latter. According to a preferred explanatory embodiment, the ducts 26 extend in the monobloc 16 in such a way that they can connect at least the second passage 21*b* of a solenoid valve 19 belonging to a first pair of solenoid valves associated with a through duct 20 to a second passage 21*b* of a solenoid valve 19 belonging to another pair of solenoid valves 19 associated with another through-duct 20.

According to a preferred embodiment shown in FIG. 10, the open end of the ducts 26 present on the face 16*b* can be conveniently closed by a safety device 27 with a controlled opening, which is structured so as to open the end of the duct 26 when the pressure of the refrigerant fluid in the duct 26 exceeds a predetermined pressure threshold. In the example shown, the safety device 27 preferably comprises a bursting disc, which is steadily integrated/connected in/to the monobloc 16, preferably on the face 16*b*.

The Applicant found out that, by closing the ends of the ducts 26 by means of the safety device 27, it is obtained the technical effect of reducing the risk of uncontrolled increases in the pressure of the fluid in the closed hydraulic branch connecting the second passages 21*b* of two or more solenoid valves 19 to one another. To this regard, we would like to point out that, in the absence of the safety devices 27, an increase in the pressure of the refrigerant fluid in the duct 26 would generate a significant increase in the third force, which, in turn, would tend to push and hold the shutter body 23 in the closed position, thus preventing it from being opened by the actuator device 25.

With reference to FIG. 6, the monobloc 16 can further be provided with one or more dead ducts 28, each extending in the monobloc 16 starting from a face 16*a* along a direction that is parallel to the axis A, beside the through-duct 20, so as to establish a fluid communication between the second passage 21*b* of a solenoid valve 19 and, preferably, a relative connector 29 present/obtained on a face 16*b*.

According to a possible embodiment shown in FIGS. 6 and 10, the monobloc 16 can further be provided with one or more preferably dead ducts 32, each extending starting from a face 16*b* of the monobloc 16 along a direction that is transverse, preferably perpendicular, to the ducts 28, so as to cross them and, hence, be in fluid communication with them, and having an open end on the face 16*b* that is closed by a safety device 27 (FIGS. 10, 12 and 13). Preferably, the ducts 32 can extend in the monobloc 16 so as to be in fluid communication with a connector 54, which is arranged on a face 16*b* that is immediately adjacent to the face 16*b* housing the safety device 27 (FIG. 10).

According to a possible embodiment shown in FIG. 11, the monobloc 16 can be further provided with at least one through-duct 33, which extends parallel to the through-ducts 20, namely parallel to the axis A, between two opposite faces 16*a* of the monobloc 16 and has an end that is closed by a solenoid valve 19 steadily fixed on a face 16*a*, and the opposite end that communicates with a connector 61 arranged/obtained on the opposite face 16*a* of the monobloc 16.

According to a possible embodiment shown in FIG. 7, the monobloc 16 can be further provided with at least one through-duct 40, which extends transversely to the axis A between two opposite faces 16*b* of the monobloc 16 and has the opposite ends that are closed by two solenoid valves 19 arranged on the faces 16*b*. According to the embodiment shown in FIG. 7, the through duct 40 mutually connects the second passages 21*b* of the two solenoid valves 19, which each have a first passage 21*a* in fluid communication with a relative connector 58 present/obtained on the face 16*a* through a preferably dead duct 37, which extends parallel to the axis A. In the example shown in FIG. 7, the monobloc 16 further comprises a preferably dead duct 41, which extends coaxially to the axis A, so as to centrally cross the through-duct 40, and has an end on the face 16*a* that is closed by a solenoid valve 19.

FIG. 13 is diagram showing a possible embodiment of the layout of the hydraulic circuit obtained in the valve distributor body 15 mounted in the recharging machine 1, wherein the latter is assumed to comprise at least the following components and/or devices and/or apparatuses: a high-pressure tap or connector 50, which connects the end of the high-pressure hose to a first connector 29, which is preferably arranged/obtained on a face 16*b* of the monobloc (FIG. 10), preferably through a first outer gauge 7, which measures the high pressure; a low-pressure tap or connector 51, which connects the end of the low-pressure hose 9 to a second connector 29, which is arranged/obtained on a face 16*b* of the monobloc 16, preferably through a second outer gauge 7; at least one pressure transducer 11, which is connected to at least one outer connector 54 (FIG. 10), which is arranged/obtained on a face 16*b* of the monobloc 16; a first fluid control apparatus 12 comprising, for example, a pressure reducer device (Formingas), which is connected to an outer connector 55 (FIG. 10), which is arranged/obtained on a face 16*b* of the monobloc 16; recharging means 10, which are provided with the main tank 10*a*, which is connected to an outer connector 56 (FIG. 10), which is arranged/obtained on a face 16*b* of the monobloc 16; one or more tanks 14, which are connected—through solenoid valves 57—to a first connector 58, which is arranged/obtained on a face 16*b* of the monobloc 16 (FIG. 7); a second fluid control apparatus 12, for example a compressor, which is connected to a connector 59, which is arranged/obtained on a face 16*a* of the monobloc 16 (FIG. 8); and a refrigerant fluid discharging assembly 60, which is connected to a connector 61, which is arranged/obtained on a face 16*b* of the monobloc 16 (FIG. 11).

According to the embodiment shown in FIG. 13, the valve distributor body 15 is provided with: a hydraulic high-pressure control circuit 70, which is designed to connect the connector 29 associated with the high-pressure hose 8 to a common connection branch 71; a hydraulic low-pressure control circuit 72, which is designed to connect the connector 29 associated with the low-pressure hose 9 to the common connection branch 71; a hydraulic discharging control circuit 73, which is designed to connect the connector 61 associated with the discharging assembly 60 to the common connection branch 71; and a hydraulic recharging control circuit 74, which is designed to connect the main tank 10a of the recharging means 10 to the common connection branch 71. The valve distributor body 15 can be further provided with a hydraulic additive substances/oil supply/separation control circuit 75, which is designed to selectively connect the connector 58 associated with the secondary tanks 14 to the common connection branch 71, a hydraulic vacuum control circuit 76, which is designed to connect the connector 59 associated with the fluid control apparatus 12 (vacuum pump) to the common connection branch 71, and a hydraulic pressure control circuit 77, which is designed to connect the connector 55 to the common connection branch 71.

The hydraulic high-pressure control circuit 70 can comprise a pair of solenoid valves 19, which have the first passages 21a connected to one another through the inner through-duct 20 (FIGS. 6 and 12), and wherein the second passage 21a of a first solenoid valve 19 is connected to the connector 29 through the dead duct 28, and the second passage 21b of the second solenoid valve 19 is connected to a duct 26 comprised in the common connection branch 71.

The hydraulic high-pressure control circuit 72 can comprise a pair of solenoid valves 19, which have the first passages 21a connected to one another through the inner through-duct 20 (FIGS. 6 and 12), the second passage 21b of a first solenoid valve 19 connected to the connector 29 through the duct 28 (FIG. 6), and the second passage 21b of the second solenoid valve 19 connected to a duct 26 comprised in the common connection branch 71.

The hydraulic discharging control circuit 73 can comprise a solenoid valve 19, which has the first passage 21a connected to the connector 61 associated with the discharging assembly 60 (FIG. 1) through a through-duct 20 and the second passage 21b connected to a relative duct 26 of the common connection branch 71.

The hydraulic recharging control circuit 74 can comprise a pair of solenoid valves 19, which have the first passages 21a connected to one another through the inner through-duct 20 (FIGS. 6 and 12), and wherein the second passage 21b of a first solenoid valve 19 of the pair is connected to the connector 56 through a dead duct (FIG. 10), and the second passage 21b of the second solenoid valve is connected to a relative duct 26 of the common connection branch 71.

The hydraulic additive substances/oil supply/separation control circuit 75 can comprise a solenoid valve 19, which has the first passage 21a connected to the connector 58 associated with the secondary tanks 14 through a dead duct 37 and the second passage 21b connected to a duct 26 of the common connection branch 71 (FIG. 7).

The hydraulic vacuum control circuit 76 can comprise a solenoid valve 19, which has the first passage 21a connected to the connector 59 through the dead duct 37 and the second passage 21b connected to a duct 26 of the common connection branch 71 (FIG. 7).

The hydraulic circuit 77 can comprise a pair of solenoid valves 19, which have the first passages 21a connected to one another through the inner through-duct 20 (FIGS. 6 and 12), and wherein the second passage 21b of a first solenoid valve 19 of the pair is connected to the connector 55 through a dead duct (FIG. 10), and the second passage 21b of the second solenoid valve 19 is connected to a relative duct 26 of the common connection branch 71.

The common connection branch 71 comprises a series of ducts 26, 49 and 41 shown in FIGS. 6, 7 and 10, which are obtained in the monobloc 16 so as to establish a communication with one another and, preferably, with a safety device 27, between the second passages 21b of the solenoid valves 19 of the hydraulic discharging control circuit 73, of the hydraulic additive substances supply control circuit 75 and of the hydraulic vacuum control circuit 76 and of a solenoid valve 19 belonging to each pair of solenoid valves 19 present in the hydraulic high-pressure control circuit 70, in the hydraulic low-pressure control circuit 72, in the hydraulic recharging control circuit 74 and in the circuit 77.

Figure 14:
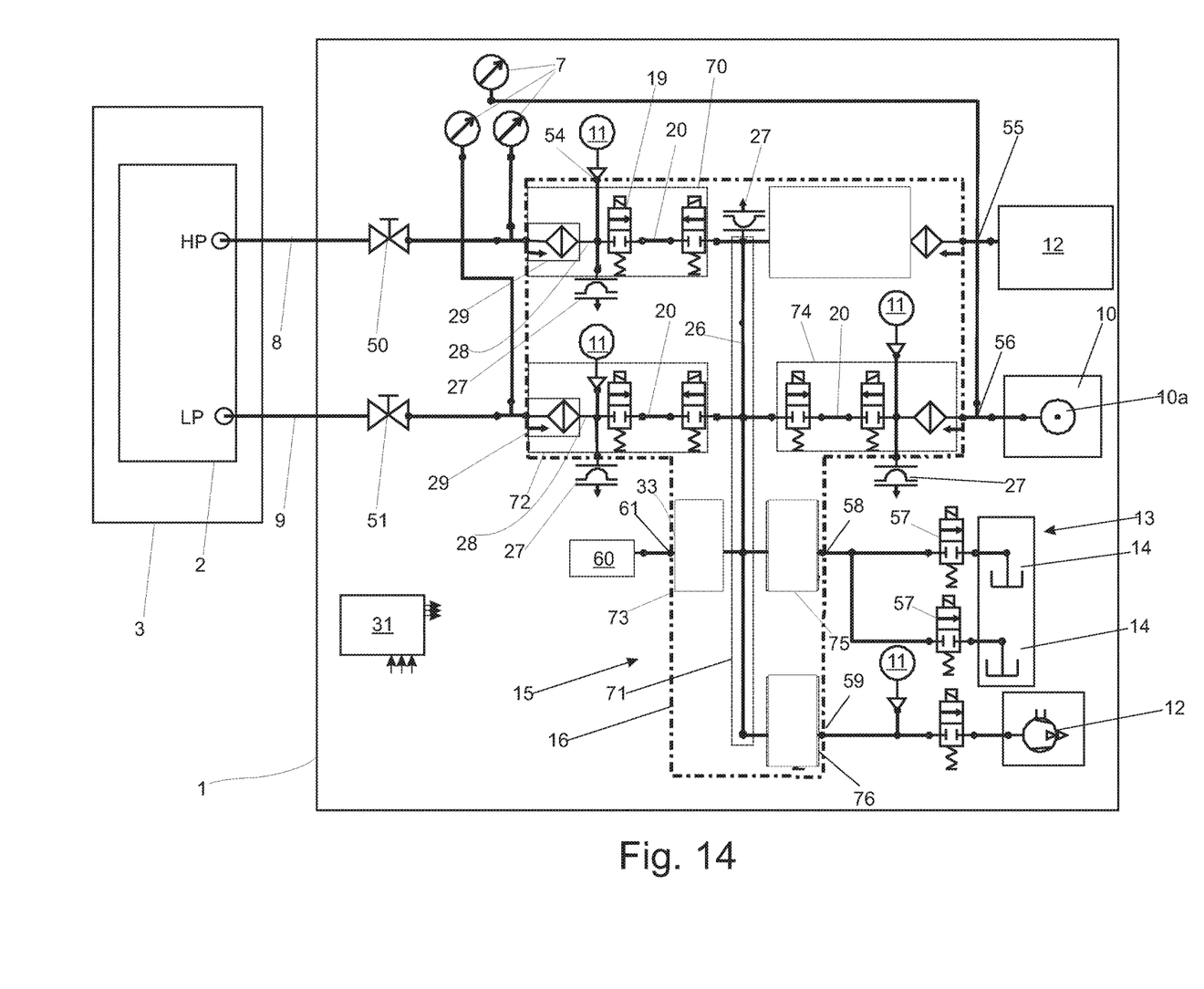
FIG. 14 is a circuit diagram showing the operation of the valve distributor body during the recharging operation carried out to recharge the refrigerant fluid.
Figure 15:
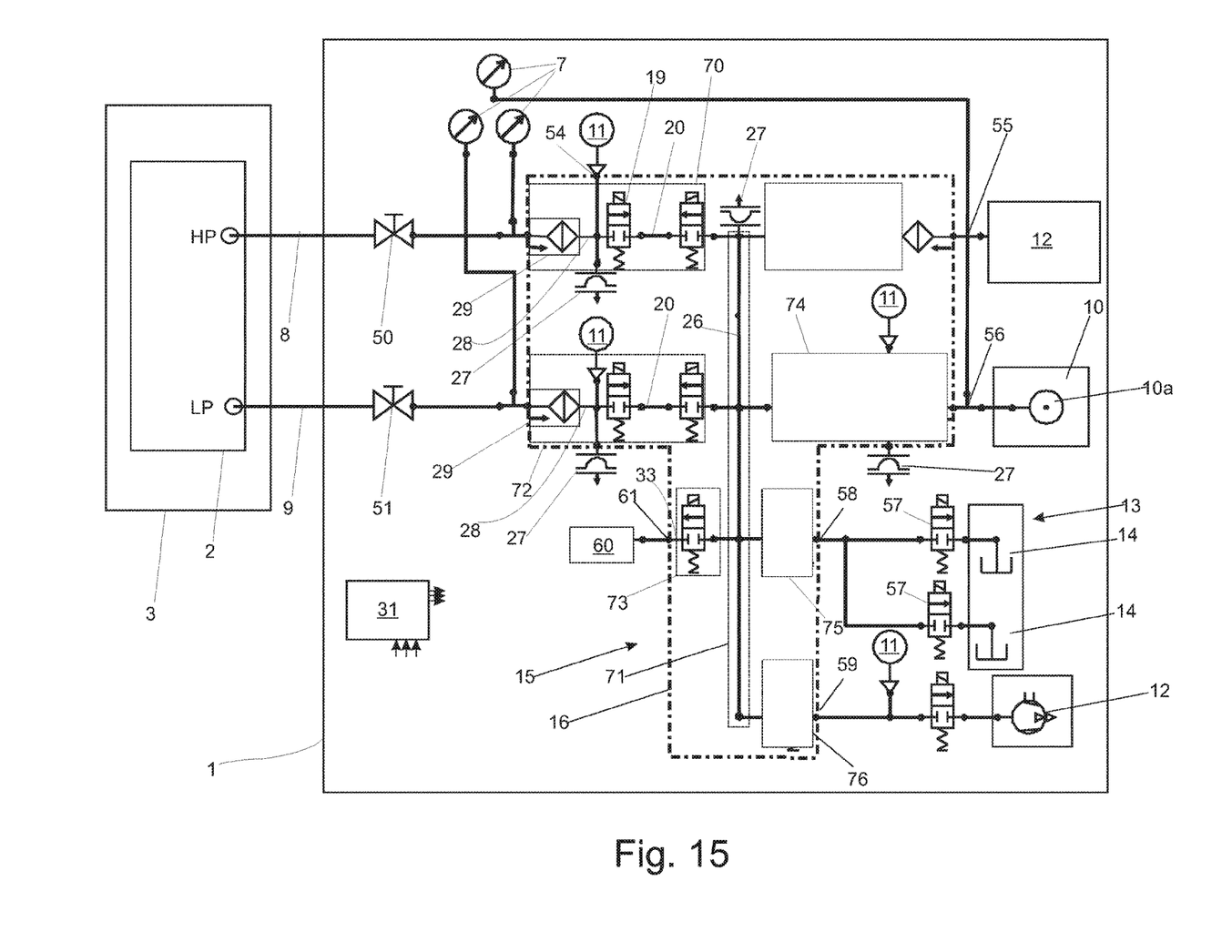
FIG. 15 is a circuit diagram showing the operation of the valve distributor body during the discharging operation carried out to discharge the refrigerant fluid.

With reference to FIGS. 14 and 15, hereinafter you can find a description of a possible example of operation of the valve distributor assembly 15 during the recharging and, respectively, discharging operations.

During the recharging operation, which is shown in FIG. 14, the electronic control unit 31 forces the closing of the solenoid valves 19 present in the control circuits 73, 75, 76 and 77 and forces the opening of the solenoid valves 19 present in the control circuits 70, 72 and 74. In order to make the drawing clearer, the control circuits 73, 75, 76 and 77, which have closed solenoid valves 19, are represented with a white rectangle. During this step, the refrigerant fluid let out—under pressure—by the main tank 10a can freely flow through the through-ducts 20 associated with the pairs of open solenoid valves 19 of the recharging control circuit 74, of the high-pressure control circuit 70 and of the low-pressure control circuit 72.

During the discharging operation, which is shown in FIG. 15, the electronic control unit 31 forces the closing of the pairs of solenoid valves 19 present in the control circuits 74, 75, 76 and 77 and forces the opening of the solenoid valves 19 present in the control circuits 70, 72 and 73. In order to make the drawing clearer, the control circuits 74, 75, 76 and 77, which have pairs of closed solenoid valves 19, are represented with a white rectangle. During this step, the refrigerant fluid let out—under pressure—by the air-conditioning system 2 flows through the through-ducts 20 associated with the pairs of open solenoid valves 19 of the high-pressure control circuit 70, of the low-pressure control circuit 72 and of the discharging control circuit 73 in order to then reach the discharging assembly 60.

The recharging machine allows you to advantageously reduce the dimensions of the valve distributor body, eliminate the use of pressure plugs and increase safety.

Finally, it is clear that the machine and the method described above can be subject to changes and variations, without for this reason going beyond the scope of protection of the invention defined in the appended claims.

The invention claimed is:

1. An air conditioning recharging machine (1) designed to recharge a refrigerant fluid into/from an air-conditioning system (2) mounted on board of a motor vehicle (3); said air conditioning recharging machine (1) comprising:
   a high-pressure hose (8) and a low-pressure hose (9) designed to be connected to said air-conditioning system (2);
   a recharging means (10) designed to supply a refrigerant fluid to said air-conditioning system (2) through said high-pressure and low-pressure hoses (8)(9) so as to perform a recharging operation of the refrigerant fluid;
   a valve distributor body (15), which is provided with a series of inlets/outlets hydraulically connected to at least said high-pressure and low-pressure hoses (8)(9) and to said recharging means (10); said valve distributor body (15) being configured to selectively connect one or more inlets to one or more outlets;

wherein said valve distributor body comprises:

a monobloc (16) which is provided with one or more first straight inner through-ducts (20), each of which extends in the monobloc (16) so as to have the two axial ends which are arranged on two respective first faces (16*a*) of said monobloc (16) opposite one to the other, and the two axial ends of each of the one or more first straight inner through-ducts (20) are closed by respective solenoid valves (19) which are directly mounted to said first faces (16*a*) of said monobloc (16) so as to be supported from said first faces (16*a*).

2. The machine according to claim 1, wherein said respective solenoid valves (19) which close the two axial ends of said first straight inner through-duct (20) are each provided with at least two passages (21*a*)(21*b*), one of which is in fluid communication, in a direct and exclusive way, with a corresponding passage of said other solenoid valve (19) through said first straight inner through-duct (20).

3. The machine according to claim 1, wherein each respective solenoid valve (19) comprises a shutter body (23) movable between an open position and a closed position; mechanical and elastic members (24) structured to exert a first force on said shutter body (23) so as to keep said shutter body (23) in said closed position; a first passage (21*a*) structured so as to cause the pressure of the fluid present in the first passage (21*a*) to exert a second force on said shutter body (23) opposite to the first force so as to cause the movement of said shutter body (23) towards said open position; a second passage (21*b*) structured so as to cause the pressure of the fluid present in the second passage (21*b*) to exert a third force on said shutter body (23) concurrent with the first force so as to cause the displacement of said shutter body (23) towards said closed position; said first through-duct (20) connects one to the other the first passages (21*a*) of two of the respective solenoid valves (19).

4. The machine according to claim 1, wherein said monobloc (16) has a parallelepiped shape, and has a reference axis (A); said first through-ducts (20) extend parallel and/or orthogonal to said reference axis (A).

5. The machine according to claim 4, wherein said monobloc (16) is provided with at least a pair of first straight inner through-ducts (20), which lie on a first laying plane perpendicular to a middle plane of said monobloc (16) and parallel to said reference axis (a);

and two couples of said respective solenoid valves (19) which are arranged on said first faces (16*a*) so as to lie on said first lying plane and are each associated with a respective first inner through-duct (20); the second passage (21*b*) of one solenoid valve (19) of one pair of solenoid valves being in fluid communication with the second passage (21*b*) of one solenoid valve (19) belonging to the other pair of said solenoid valves through at least a second duct (26) which extends transverse to said first straight inner first duct (20) on a second lying plane which is in turn parallel to and spaced apart from the first lying plane.

6. The machine according to claim 4, wherein said monobloc (16) is provided with at least four through-ducts (20) closed, at the axial ends, by four respective pairs of solenoid valves (19) arranged on said first faces (16*a*).

7. The machine according to claim 5, wherein said second duct (26) extends in said monobloc (16) so as to have an opening on a second face (16*b*) of said monobloc (16) perpendicular to said first face (16*a*) that is closed by a bursting disc (27).

8. The machine according to claim 1, wherein said refrigerant fluid comprises carbon dioxide.

\* \* \* \* \*